United States Patent
Pallakoff (10) Patent No.: US 7,016,704 B2
(45) Date of Patent: Mar. 21, 2006

(54) COORDINATING IMAGES DISPLAYED ON DEVICES WITH TWO OR MORE DISPLAYS

(75) Inventor: Matthew G. Pallakoff, Mountain View, CA (US)

(73) Assignee: MOVE Mobile Systems, Inc., Mountain View, CA (US)

( * ) Notice: Subject to any disclaimer, the term of this patent is extended or adjusted under 35 U.S.C. 154(b) by 534 days.

(21) Appl. No.: 10/113,239

(22) Filed: Apr. 1, 2002

(65) Prior Publication Data

US 2002/0151283 A1    Oct. 17, 2002

Related U.S. Application Data

(60) Provisional application No. 60/280,791, filed on Apr. 2, 2001.

(51) Int. Cl.
*H04B 1/38* (2006.01)
*H04M 1/00* (2006.01)

(52) U.S. Cl. .................. 455/566; 455/556.2; 455/563; 455/419

(58) Field of Classification Search ................ 455/566, 455/414.1, 414.2, 414.3, 414.4, 419, 457, 455/556.2, 550.1, 557, 563, 418, 575.1, 90.3
See application file for complete search history.

(56) References Cited

U.S. PATENT DOCUMENTS

| 5,633,912 A * | 5/1997 | Tsoi ........................... 455/566 |
| 6,073,034 A | 6/2000 | Jacobsen et al. |
| 6,085,112 A | 7/2000 | Kleinschmidt et al. |
| 6,144,358 A * | 11/2000 | Narayanaswamy et al. . 345/102 |
| 6,211,858 B1 | 4/2001 | Moon et al. |
| 6,243,596 B1 | 6/2001 | Kikinis |
| 6,275,714 B1 * | 8/2001 | Kintz et al. .................. 455/566 |
| 6,418,329 B1 | 7/2002 | Furuya |
| 6,424,843 B1 | 7/2002 | Reitmaa et al. |
| 6,486,890 B1 * | 11/2002 | Harada et al. ............... 345/660 |
| 2001/0034250 A1 * | 10/2001 | Chadha ....................... 455/566 |
| 2002/0042288 A1 * | 4/2002 | Nakayama ................... 455/553 |
| 2002/0044065 A1 * | 4/2002 | Quist et al. ................. 307/10.1 |
| 2002/0090980 A1 * | 7/2002 | Wilcox et al. ............... 455/566 |

* cited by examiner

*Primary Examiner*—Tilahun Gesesse
*Assistant Examiner*—John J. Lee
(74) *Attorney, Agent, or Firm*—Bay Area IP, LLC; Ariel Bentolila (57) ABSTRACT

A hand held electronic device having at least two displays is disclosed. At least one display is a direct-view display, like those on most cell phones or PDAs in use in 2001, for viewing at normal reading distance of approximately 12 to 24 inches ("arms'-length" viewing). At least one of the other displays is a microdisplay, a tiny display with magnifying optical elements, for viewing larger, higher-resolution images when the microdisplay is positioned close to the eye. The invention allows coordinating microdisplays and direct-view displays in ways that allow people to comfortably access and interact with full-page Web content on pocket-size devices. When a user is viewing a Web page (or other content) on a device's microdisplay held near-to-eye, the device allows the user to position a cursor or a rectangular outline (or some other indication of a "region of interest") on a particular part of the Web page, and then when the user moves the device out to arms'-length viewing, the user should be able to view that region of interest on the direct-view display—that is, view a subset of the larger image that appeared on the microdisplay.

41 Claims, 6 Drawing Sheets

Figure 4 -- Hand-set with two displays and with buttons for highlighting and selecting selectable items on a list of selectable items displayed on one of the displays

COORDINATING IMAGES DISPLAYED ON DEVICES WITH TWO OR MORE DISPLAYS

RELATED APPLICATIONS

This application claims priority, under 35 USC § 120, from U.S. Provisional Patent Application No. 60/280,791, filed on Apr. 2, 2001.

BACKGROUND OF THE INVENTION

The invention generally relates to hand-held communication and computing devices, such as cellular-phone handsets, smart-phones, Web-phones, and PDAs. More specifically, the invention relates to systems and methods for coordinating images displayed on hand-held devices that have two or more displays, especially those that include a direct-view display for viewing relatively low-resolution text or images (like the displays built into most cellular phones today), and a microdisplay that uses magnifying optics to display images that, when the microdisplay is held near a user's, eye can appear larger and higher resolution than the images shown on the direct-view display.

Using recently developed high-resolution microdisplay module technology, device makers can embed microdisplays in devices, or attach microdisplays including wearable displays to devices, and allow users to view full-size web-pages on pocket-size devices—as well as being able to view large video and still images, blueprints, office documents, and other high-resolution content.

Device makers have experimented with embedding microdisplays in devices and attaching microdisplays to devices (including attaching wearable near-to-eye displays). However, prior to this invention, it has been awkward and difficult to navigate and interact with full-size Web pages and other documents and applications displayed on the microdisplays of microdisplay-enhanced hand-held devices. Devices with embedded microdisplays must be held near-to-eye to see the content on the microdisplays. While users do not mind briefly bringing a device near-to-eye to view content (after all, that is what we do with cameras), users do not want to hold a device near to eye for longer periods of time. If a user is spending five minutes, ten minutes, or more reading or interacting with a set of Web pages or other documents, and if they have to hold a device near-to-eye continuously during that time, they will grow uncomfortable with the device. Furthermore, typing text on a hand-held device (already a relative awkward activity) is exceedingly awkward when the device has to be held near-to-eye to see the text as you type it. Devices with attached wearable displays, such as the head-mounted monocular displays that Xybernaut Corp. uses in their wearable computer systems, allow users to comfortably keep microdisplays near-to-eye for longer periods of time (relative to hand-held devices with embedded displays); but users still find it awkward to type text into documents viewed on wearable displays. Typing text into a Web page or other document displayed by a device on a microdisplay typically involves either using a cursor control to "type" on a virtual keyboard image shown on the microdisplay (e.g. moving the cursor over each character displayed on the virtual keyboard and clicking), or using a separate physical device (such as a keypad, a keyboard, a tablet or writing pad, or a virtual keyboard). Typing using a virtual keyboard displayed on the microdisplay is tedious and slow (particularly when holding a device near-to-eye) because it requires the user to carefully position the cursor over each little character on the virtual keyboard to type each character. Further, using a mouse on a regular computer to type text on a virtual keyboard is awkward, and it is even more awkward when using a near-to-eye microdisplay. Even when a user can type text on a physical keypad while looking at a document on a wearable display, if user's haven't learned to touch-type well (i.e. type without looking at the keypad), then users can experience an uncomfortable mental disconnect as they frequently shift their eye (or eyes) between the keypad and the image displayed on the wearable display's near-to-eye microdisplays.

However, the potential benefits of using near-to-eye microdisplays with hand-held devices are tremendous: They can allow users to view full-size web pages and other high-resolution content on pocket-size devices. So solving the problems outlined above would enable the development of compelling new types of hand-held devices. This patent describes inventions that help solve these problems.

"A device with which the invention can be implemented is disclosed and claimed in U.S. published Application No. 20020158812, filed on even date herewith, assigned to the common assignee, and incorporated herein by reference."

In devices using the present invention, at least one display is a direct-view display, like those on most cell phones or PDAs in use in 2001, for viewing at normal reading distance of approximately 12 to 24 inches (which this patent will refer to as "arms'-length" viewing). And at least one of the displays is a microdisplay, a tiny display with magnifying optical elements, for viewing larger, higher-resolution images when the microdisplay is positioned close to the eye. The microdisplays can be embedded in devices, or they can be attached to the devices, or the microdisplays can be in wearable displays attached to the devices (wirelessly or through a cable). Many digital video cameras use microdisplays for their view-finders: When a user brings the viewfinder to their eye when the camera is playing back video, the user can watch a larger image of the video-clip than could be seen on small direct-view display. In recent years, high resolution microdisplays have been developed that can present images large enough to display most Web pages. For example, Inviso Inc.'s 3430 Optiscape II microdisplay displays an 800×600 pixel color image that appears to users to be as large as a 19-inch monitor roughly 2.5 feet away. Since optics are used to create an image that looks large, despite the fact that the microdisplay module is small, these images are often called "virtual images". And in this patent we will sometimes call them "apparent images". Preferred embodiments of this invention would normally be implemented on devices using microdisplays that can display color images at least 800 pixels wide and at least 600 pixels tall.

An important common characteristic of the preferred embodiments of the present invention is that they are designed to facilitate a seamless, natural transition between near-to-eye viewing of content on a device's microdisplay (or microdisplays) and arms'-length viewing of content on a direct-view display. Key to enabling this seamless transition is software, hardware and storage mechanisms that are used to intelligently coordinate images on the microdisplay with images on the direct-view display. Using the descriptions in this patent and the figures for this patent (which help illustrate some of the graphical user interface elements of the invention disclosed herein), ordinary hardware and firmware engineers skilled in the art of developing computing and communication devices will be able to implement the hardware, and storage inventions disclosed herein, and ordinary programmers skilled in the art of software engineering on hand-held devices will be able to write their own code to implement the software inventions disclosed herein for devices that embody the hardware and storage inventions disclosed herein.

A preferred embodiment of my invention is a "smart-phone" supporting functions such as instant messaging, email, and contact management, in addition to phone calling, with both a microdisplay and a direct-view display. Since most instant messages, for example, are relative short text messages, this smart-phone could display instant messages on the direct-view display so that users can see the messages at arm's length, and can concurrently see the keys, buttons and controls on the phone handset so the user can easily type replies to the messages. When an instant message includes a reference to a Web page URL, or includes an attached photo or other relatively large high-resolution image or document, then when the user chooses to view that Web page or attachment, the smart-phone can display the Web page or attachment in the microdisplay instead of the direct-view display. This allows the user to see the Web page or attachment, which may be relatively large and high-resolution, by bringing the microdisplay to the user's eye, much like a PC display like image.

Additionally, when the device is displaying an image (or is preparing to display an image) in one display but not the others, then the device can display a text or graphics indication on one or more of the displays that is not displaying that image, indicating that one of the other displays is displaying that image (or that the device is preparing to display that image). For example, if the user sees an instant message in the-direct-view display (on a device with one direct-view display and one microdisplay), and that instant message refers to a Web page URL, if the user chooses to view that Web page, then while the device is downloading or preparing the Web page for display on the microdisplay the device can display a flashing eye icon on the direct-view display; and when the Web page is ready for viewing on the microdisplay, then the device can display a static icon on the direct-view display. This lets the user know that the user can now bring the device near-to-eye to view the Web page in a high resolution, magnified form. The same technique can be used any time the user can operate functions using the direct-view display that result in content then appearing on the microdisplay, or vice-versa. (If the user has the device near-to-eye and operates a function that results in new content appearing on the direct-view display, the microdisplay can display some indication that there is new content to view on the direct-view display.) It is important to provide these cues, since a user typically can not see the content on a microdisplay when holding the device at arms-length, and a user typically can not see content on a direct-view display (or doesn't think to look at the direct-view display) when looking into a microdisplay that is near-to-eye.

Device designers can choose to use the direct-view display as the primary display for many smart-phone functions, including instant messaging, email, phone dialing, contact management, schedule management, calculator functions, and the like, and to use the microdisplay as a high resolution viewer coordinated with the direct-view display.

In the emerging age of Internet-enabled mobile devices, some of the most important embodiments of this invention involve coordinating microdisplays and direct-view displays in ways that allow people to comfortably access and interact with full-page Web content on pocket-size devices. One important way our invention does this is as follows: When a user is viewing a Web page (or other content) on a device's microdisplay held near-to-eye, the device should allow the user to position a cursor or a rectangular outline (or some other indication of a "region of interest") on a particular part of the Web page, and then when the user moves the device out to arms'-length the user should be able to view that region of interest on the direct-view display—that is, view a subset of the larger image that appeared on the microdisplay. This patent will refer to this subset as a "region of interest subset" or a "region of interest".

When the direct-view display displays this region of interest, the direct-view display acts as a window onto the larger image that the user had been viewing on the microdisplay. That is, the region of interest portion of the image seen on the microdisplay is mirrored on the direct-view display. The user should then be able to read text or interact with content in that region of interest, or use controls on the device to scroll the region of interest left, right, up, down, or other directions, to see different parts of the image other than the subset of the image currently shown in the direct-view display. If the user moves the region of interest while viewing the image in the direct-view display, then when the user returns to viewing the image in the microdisplay, the device can graphically indicate where the region of interest has moved—for example, by overlaying a rectangle in the shape of the region of interest (which will generally correspond to the pixel width and height of the direct-view display) on top of the image seen in the microdisplay. Device makers can choose not to explicitly show a rectangle or other explicit representation of the region of interest on the image viewed in the microdisplay, or choose to make this kind of explicit "region of interest" indicator optional for the user. Whether or not the region of interest is explicitly outlined on the image viewed in the microdisplay, the device can mirror the region of interest in the direct-view display, as described above. Also note that the region of interest does not necessarily have to be rectangular. For example, a device designer could choose to use a circular or other shaped direct-view display (for example, on a watch or a non-conventional cell-phone or PDA), and then choose to use a correspondingly shaped region of interest.

The usage model facilitated by this invention mirrors what happens when a person uses a desktop computer monitor: Typically a person briefly "takes in" the entire monitor display (i.e., looks at the entire image without focusing attention on any specific region of the display at first), and then focuses attention on a specific region of interest (such as text they want to read, or a text-insertion point where they want to type, or some other item of interest). This invention allows microdisplay-enhanced devices to model this behavior.

As a result, this invention enables better ergonomics and better power-consumption characteristics than previous designs for many types of microdisplay-enhanced devices. With this invention, a user can choose to briefly observe a large area of content displayed on the microdisplay, and quickly skim the large area of content to identify a region of interest where they want to focus attention—and then (if they want) they can bring the device to arms'-length to view and interact with that region of interest on the direct-view display. By allowing the user to view a large area of content on the microdisplay, users can quickly orient themselves and quickly skim the large area of content to find a specific region of interest—just as they do on desktop monitors. This is something users cannot do on the small direct-view displays available on pocket-sized phones, PDAs, and hand-held computers that do not include embedded or attached microdisplays. Then, by allowing users to move the region of interest on the direct-view display held at arms'-length, users can choose to do most of their reading, typing, and other interacting with content while holding the device at arms'-length (i.e. normal reading distance). Being able to frequently operate the device and interact with Web pages and other content while holding the device at arms'-length is more comfortable for many people than having to hold a device near-to-eye for long periods. And it is much easier to type text on a device held at arms'-length than a device held near-to-eye. In addition, when the user is not holding the device near-to-eye, the microdisplay can be turned off or idled, saving power—so devices that use this invention can use significantly less power than devices that leave microdisplays on continuously. Similarly, when the user is holding the device near-to-eye, direct-view displays on the device can be turned off or dimmed or idled, saving power.

Clearly this method of intelligently coordinating content on microdisplays with content on direct-view displays can be applied to a wide range of content in addition to Web pages—including content such as spreadsheets, presentations, word processor files, blueprints, video, database forms, and other types of images, documents and applications.

The primary motivation for this invention has to make it feasible for people to comfortably access and interact with full size Web content (and other high-resolution or large visual content) on pocket-size devices with built-in or attachable microdisplays. But the present invention's embodiments related to intelligently coordinating direct-view displays and microdisplays are applicable even when the microdisplays are part of a wearable display connected to the device rather than being embedded in or attached directly to the device. Wearable displays can include one or two microdisplays. For example, Inviso Inc.'s binocular wearable display product concept called "eShades" included two microdisplays, one for each eye. If a user is wearing a wearable display and looking at the near-to-eye microdisplays of the wearable display, they may find it awkward to type, particularly if the user has to look at a device's keypad frequently to find the letter keys while typing. A monocular wearable display (i.e. one with just one microdisplay positioned in front of one eye) lets the user use the other eye to look at the keypad; and many binocular wearable displays (like Inviso Inc.'s eShades concept product) allow users to see below the displays and therefore see a device's keypad held below the field of view of the wearable displays. But it is awkward to have to continuously shift ones eyes between the keypad and the image presented by the microdisplay while typing. Most users would be more comfortable if the region surrounding the current text-entry point (which might be an editable text field on a Web-based form, for example) were mirrored in the direct-view display of the device the user is using to type, ideally with the direct-view display close to the keypad on the device. This allows the user to keep their eyes focused in a small area on the device while typing.

DETAILED DESCRIPTION OF PREFERRED EMBODIMENTS

Figure 1A:
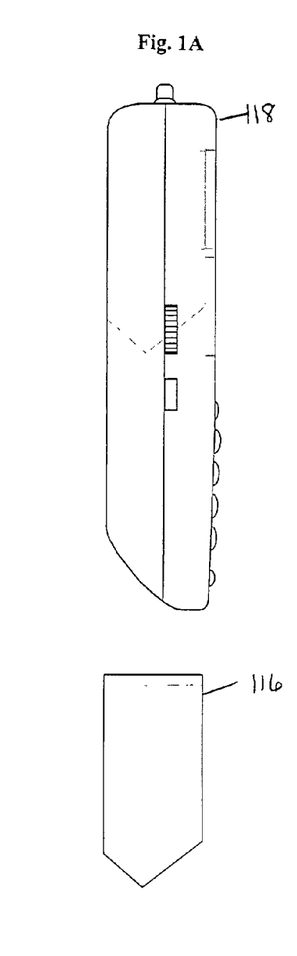
FIG. 1A is a side view of a microdisplay-enhanced handset.
Figure 1B:
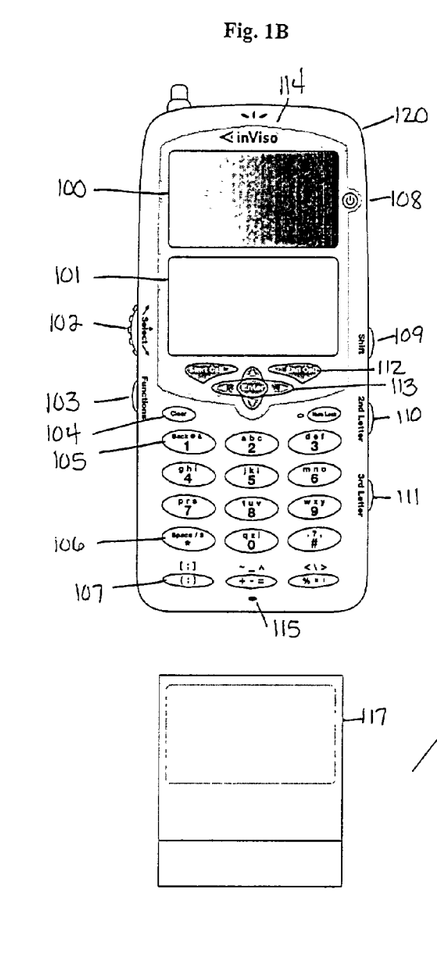
FIG. 1B is a front view of a microdisplay-enhanced handset.
Figure 1C:
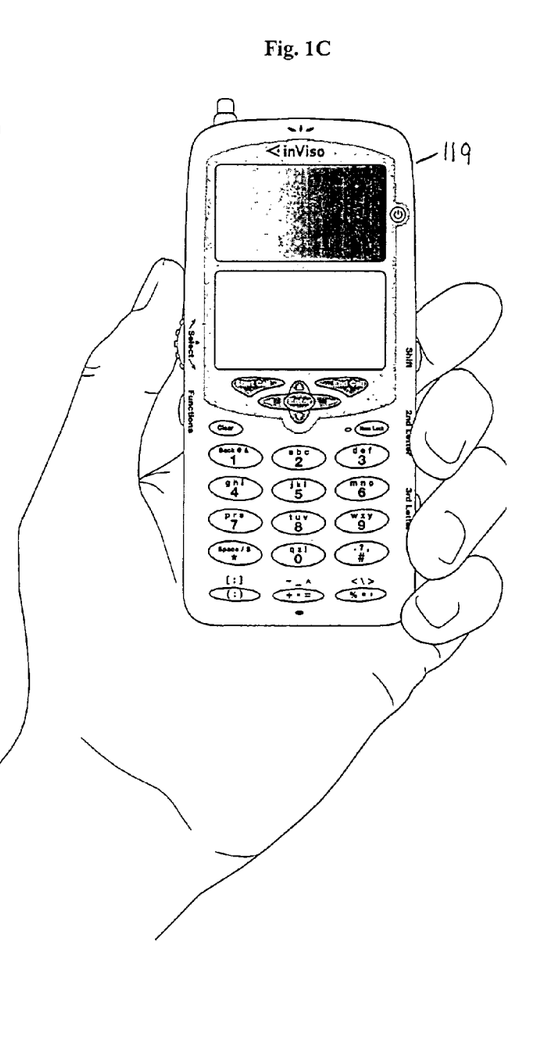
FIG. 1C is a front view of a microdisplay-enhanced handset, held in a person's hand.

The following describes a handset on which my invention can be embodied. FIG. 1A shows a microdisplay-enhanced handset 118 in side-view. FIG. 1B shows the same in front-view. FIG. 1C shows the same in front-view, shown held in a person's hand. This handset includes a microdisplay 100 positioned above a direct-view display 101. Most of the elements of this handset could be applied to a wide range of devices—including cellular phones, "Smart-phones", Web-phones, PDAs, hand-held computers, remote controls, and others. Throughout the rest of this patent, most references to "handsets" can refer to any of these types of devices.

The direct-view display can be any kind of direct-view display, but preferably it would be a thin bit-map LCD display with less resolution than the microdisplay but enough to render an identifiable portion of a larger image. For example, a 160×120-pixel direct-view display with 3-bits of gray scale (white, black, and six intensities of gray in-between white and black) would be sufficient for displaying text and simple graphics while still keeping the cost of the direct-view display relatively low.

Below the side-view of FIG. 1A and the first front-view illustrations of the handset in FIG. 1B are side-view 116 and front-view 117 illustrations of Inviso's 3430 Optiscape microdisplay module which includes electronics and optics—just to illustrate their size relative to the overall handset. Many other elements on this handset are common on cell phone handsets today such as the speaker 114, a power on/off button 108, a microphone 115, "Start Call" and "End Call" buttons 112.

Handset users frequently interact with various functions supported on the handset, such as instant messaging, email, contact management, dialing from a list of contacts, calculator, Web browsing, and so on. To interact with those functions, users need to see (or hear) feedback as they use the functions. For example, when typing an instant message, a user needs to see the text the user is typing to know that it's being typed correctly. For most functions, including instant messaging, the feedback presented by the handset is relatively simple and brief—capable of being expressed in a few lines of text or in a small low-resolution bit-mapped display. On handsets built according to this invention, relatively simpler or brief feedback should usually be presented on the direct-view display 100 of FIG. 1B, as is done on a traditional handset that has only a direct-view display. This allows users to see the feedback while holding the handset at arms' length (as opposed to near-to-eye) so they can still easily see and operate the handset's buttons and other controls. But when a function involves viewing or interacting with a large image, such as a Web page, a spreadsheet, or a high-resolution document attached to an email, then a handset built according to this invention should display that image on the microdisplay 101 of FIG. 1B.

While different handsets can differ in what they display on the two displays (the microdisplay 101 and the direct-view display 100), in general designers should strive to allow users to interact with the handset's functions while viewing the direct-view display. That makes it easier to see and operate more of the device's buttons and controls (e.g. for typing or for navigating through the functions' features) as compared to holding the device near-to-eye. Of course, designers can also allow users to interact with functions while holding the device near-to-eye and using the microdisplay by designing the handset so it displays some feedback on the microdisplay (instead of, or in addition to, displaying that feedback on the direct-view display).

With a one-piece handset such as the one illustrated in FIG. 1, there are two advantages to placing the microdisplay near the top of the handset and placing the direct-view display in the middle of the phone (above the keypad). First, it makes it easier for the user to bring the microdisplay close to the eye, as compared to placing the microdisplay in the middle or at the bottom of the handset. Second, it places the direct-view display (where feedback for most text being typed would be presented) near the keyboard (so the user does not have to move their eyes far from the typing keys to the display showing the feedback).

The device can also be designed such that depressing a given button on the device (or depressing a combination of one or more buttons or controls) results in the device popping up and displaying (on one or more displays) a menu in a menu bar associated with the device or with the front window on the device (such as the "File" menu at the top left of documents on most PC documents) while concurrently highlighting the top menu item in that menu. Then depressing left or right arrow buttons on the device, such as those in control 113 on FIG. 1, could closes the currently popped-up menu and causes popping up the previous or next menu in the menu bar and highlights the top item on the menu. Further, the device could be designed such that further depressing up or down arrows on the device (such as those in control 113 on FIG. 1) highlights the next or previous menu item in the currently popped up menu. At that point, pressing an "enter" or "select" button on the phone results in the highlighted menu item being selected. Different types of items can do different things when selected in this way. Typically, selecting an item should cause the same behavior as would occur on a PC if the user used a mouse to click on that type of item. For example, selecting a check box that is not currently checked should cause it to be checked; and selecting a check box that is currently checked should cause it to be unchecked.

The device can further be designed such that spoken commands via speech recognition software can be used to pop up and traverse menus or to select menu items; and in which the device's speech recognition features are enabled only when the user holds in a button designed for that function on the device. This "push-to-talk" button could be on the side of the device where a user could depress it with a finger or thumb on the hand holding the device.

Figure 2A:
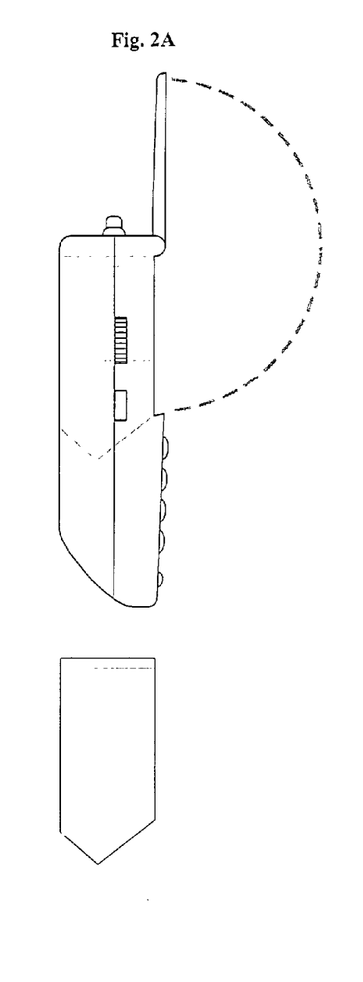
FIG. 2A is a side view of a flip-style handset with both a direct-view display and a microdisplay.
Figure 2B:
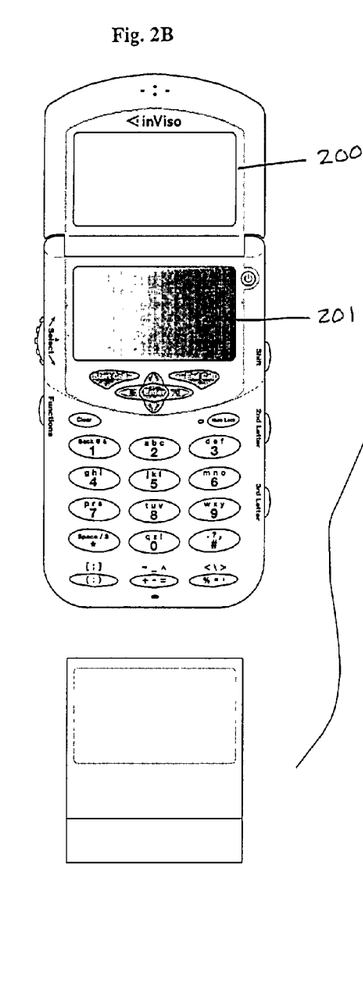
FIG. 2B is a front view of a flip-style handset with both a direct-view display and a microdisplay.
Figure 2C:
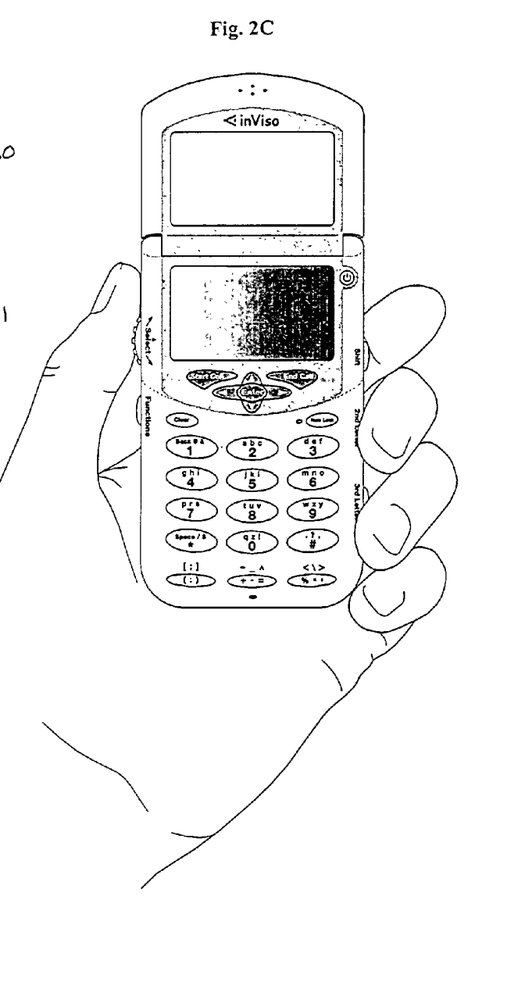
FIG. 2C is a front view of a flip-style handset with both a direct-view display and a microdisplay, held in a person's hand.

FIG. 2A through FIG. 2C illustrate a flip-style handset with both a direct-view display 200 and a microdisplay 201. Microdisplays are relatively thick (because of their magnifying optical elements) and direct-view displays are relatively thin (since they are lower resolution and do not require magnifying optical elements). So a flip-style phone would place the direct-view display on the thin part of the phone that flips away from the main body of the phone. In FIG. 2B, this is the top part of the phone. A flip-style phone could also be designed in which the keyboard and the direct-view display are on a relatively thin bottom part of the phone, and the microdisplay is on a relatively thick top part of the phone that flips up. But that would tend to make the phone feel top-heavy.

Figure 3A:
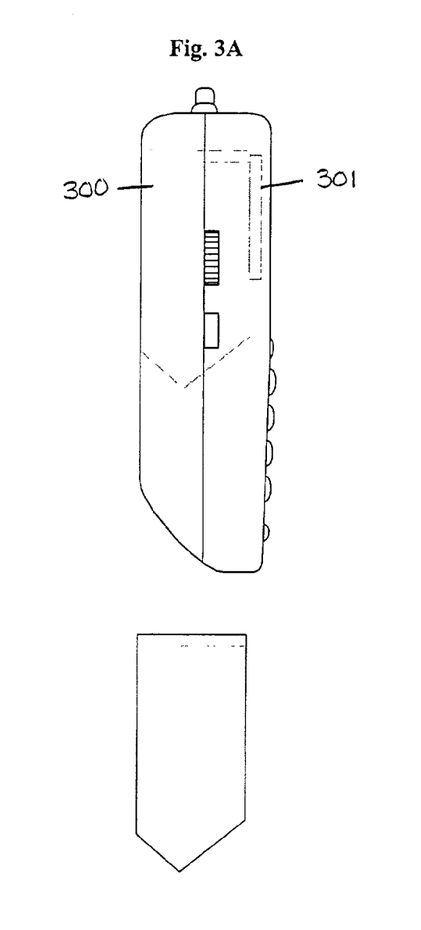
FIG. 3A is a side view of an alternative configuration for a handset with both a microdisplay and a direct-view display.
Figure 3B:
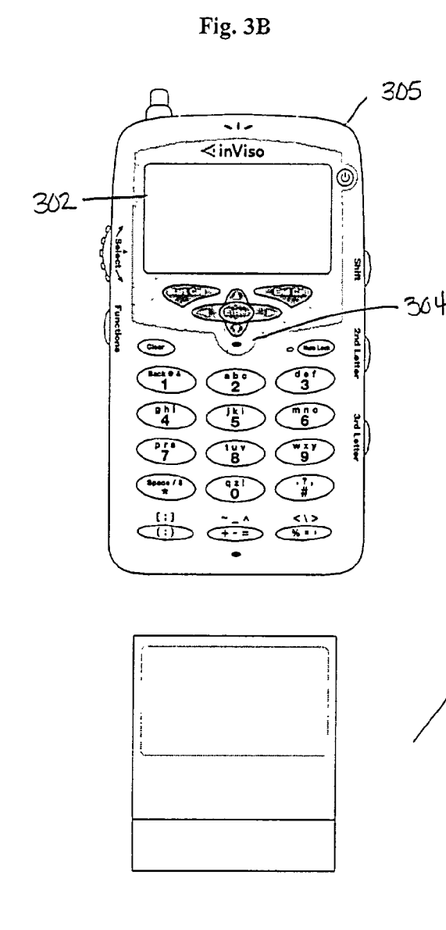
FIG. 3B is a front view of an alternative configuration for a handset with both a microdisplay and a direct-view display.
Figure 3C:
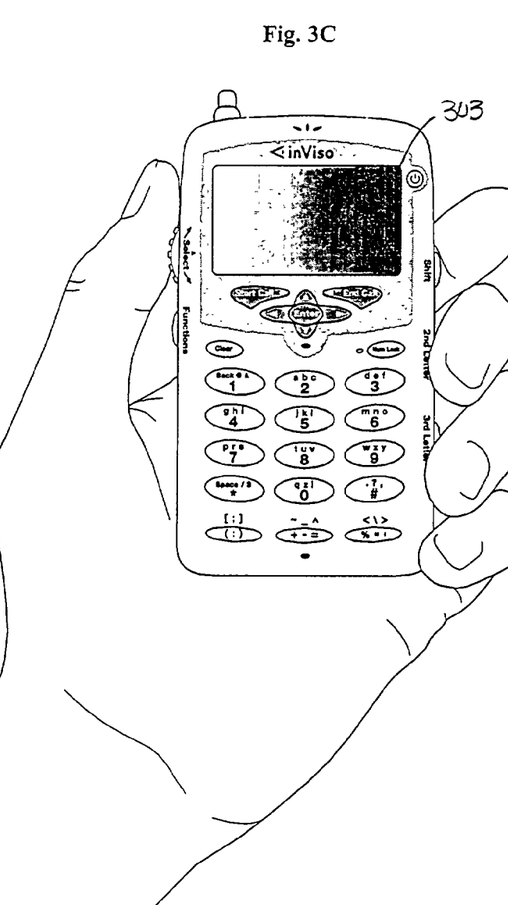
FIG. 3C is a front view of an alternative configuration for a handset with both a microdisplay and a direct-view display, held in a person's hand.

FIG. 3A through FIG. 3C illustrate a compelling alternative configuration for a handset with both a microdisplay 300 and a direct-view display 301 as seen in the side-view representation of FIG. 3A. In this embodiment, the direct-view display is placed directly over the microdisplay. As noted above, for most functions (placing a phone call, scrolling through lists of contacts, and instant messaging, for example) the user simply uses the direct-view display for feedback, since the feedback consists of relatively low-resolution text or images. In these instances, when the user looks at the front of the phone 305 in FIG. 3B, he or she see the relatively low-resolution text or images on the direct-view display 302. But when the user decides to view an image or document that is best viewed on full-screen, high resolution displays (Web pages, excel spread-sheets, large photos, etc.) then the handset would display that image or document on the microdisplay. A handset can be designed to have a button (or other control) that the user uses to make the direct-view display become transparent (and to turn the microdisplay on) so the user can see through to the microdisplay. But a preferred embodiment would include a distance-sensor 304 in FIG. 3B that automatically senses when the user's eye is close to the microdisplay (within 2–3 inches) and then automatically makes the direct-view display (302 in FIG. 3A and FIG. 3B) transparent and turns on the microdisplay (300 in FIG. 3A and 303 in FIG. 3C) so the user can see through the direct-view display 301 to the image presented by the microdisplay 300. Various distance-sensing technologies—including ultrasonic distance sensors—are used in current digital video cameras, still cameras, and other electronic devices. For example, the Sony Mavica MVC CD1000 digital still camera has both a direct-view display on its back and a separate mid-resolution microdisplay in its view finder, and it includes a distance sensor so that when a user puts their eye close to the view finder the microdisplay-based view finder automatically turns on. This handset of FIG. 3A through FIG. 3C would automatically turn on the microdisplay only when the handset is displaying a high-resolution image and when the sensor senses that the user's eye is close enough to the microdisplay—within three inches or so. At all other times, the handset would automatically turn the microdisplay off, saving considerable power relative to a device that leaves the microdisplay on all the time or one that leaves it on even when the user's eye is not close to the microdisplay. As used herein, the phrase "turn the microdisplay off" means to deactivate the microdisplay such that it is not generating images or generating any light that would prevent the correct operation of the direct-view display. It does not necessarily mean that no power is being supplied to the microdisplay. However, the result is substantial power savings.

This handset of FIG. 3A through FIG. 3C can also be built less tall than handsets that separate the two displays (as in FIG. 1A through FIG. 1C), since the two displays overlap one another in this design, although it could make the phones a bit thicker when viewed from the side.

A handset could also be designed with a direct-view display on one side of the handset (such as the front) and a microdisplay on the other side of the handset (such as the back). But this would require users to turn the handset over when switching between viewing the direct-view display and viewing the microdisplay—which is more awkward than simply bringing the handset to the eye to view an image in the microdisplay.

On any of these dual-display devices, either or both of the displays could be touch sensitive (like many PDAs today), allowing users to input data and control aspects of the device by moving their fingers, a pen, or a stylus across the touch-sensitive area of the display(s).

Each of the handsets illustrated in FIG. 1A through FIG. 3C is shown with three side-buttons on the right side— "Shift", "2nd Letter", and "3rd Letter" side-buttons—which a user can press with the hand holding the phone while simultaneously using the other hand to type the handset's face-keys. For example, to type the lowercase letter "m", the user would just type the "6" key. To type the uppercase letter "M", the user would type the "6" key while holding in the "Shift" side-button. To type the lower-case letter "u", the user would type the "8" key while holding in the "2nd Letter" side-button. To type the upper-case letter "U", the user would type the "8" key while holding in both the "Shift" side-button and the "2nd Letter" side-button.

This can allow for faster text-typing than on current cell phones and PDAs. This is important for typing-intensive applications and functions such as instant messaging, email, interacting with some Web pages, and other applications that involve entering information into forms or documents.

"That fast-typing-enabling invention is the subject of published application No. 20020163504, filed Mar. 11, 2002," assigned to the common assignee and incorporated herein by reference.

The device can also include a roller control 102 of FIG. 1B which, when rolled in one direction, changes the highlighting in a displayed list of selectable items from the currently highlighted item to the next selectable item; and, when rolled in the other direction, changes the highlighting from the currently highlighted item to the previous selectable item. This is similar to using the Tab-forward and Tab-back keys on a Windows PC to move the highlighted item on a Web-page, dialog or other document—often called the "focus" by programmers—from one selectable item to the next one or to the previous one. Note the "list" of selectable items does not have to appear linear: A web-page has a "list" of selectable items, as seen in the Web-page's HTML, even if those items are arranged nonlinearly in a two-dimensional design. In fact, a "selectable" item can be any displayed item that can either be selected or, in the case of a text-entry box, typed into. The device can also be designed to apply to items that are part of Web pages and other documents, as well as to items that are displayed by the handset itself such as the list of functions available on the phone device. In all these cases, a roller control can also be used to traverse through lists of items and to select items. The roller control 102 can also be pressed to select the highlighted item in any displayed list of items.

Figure 4:
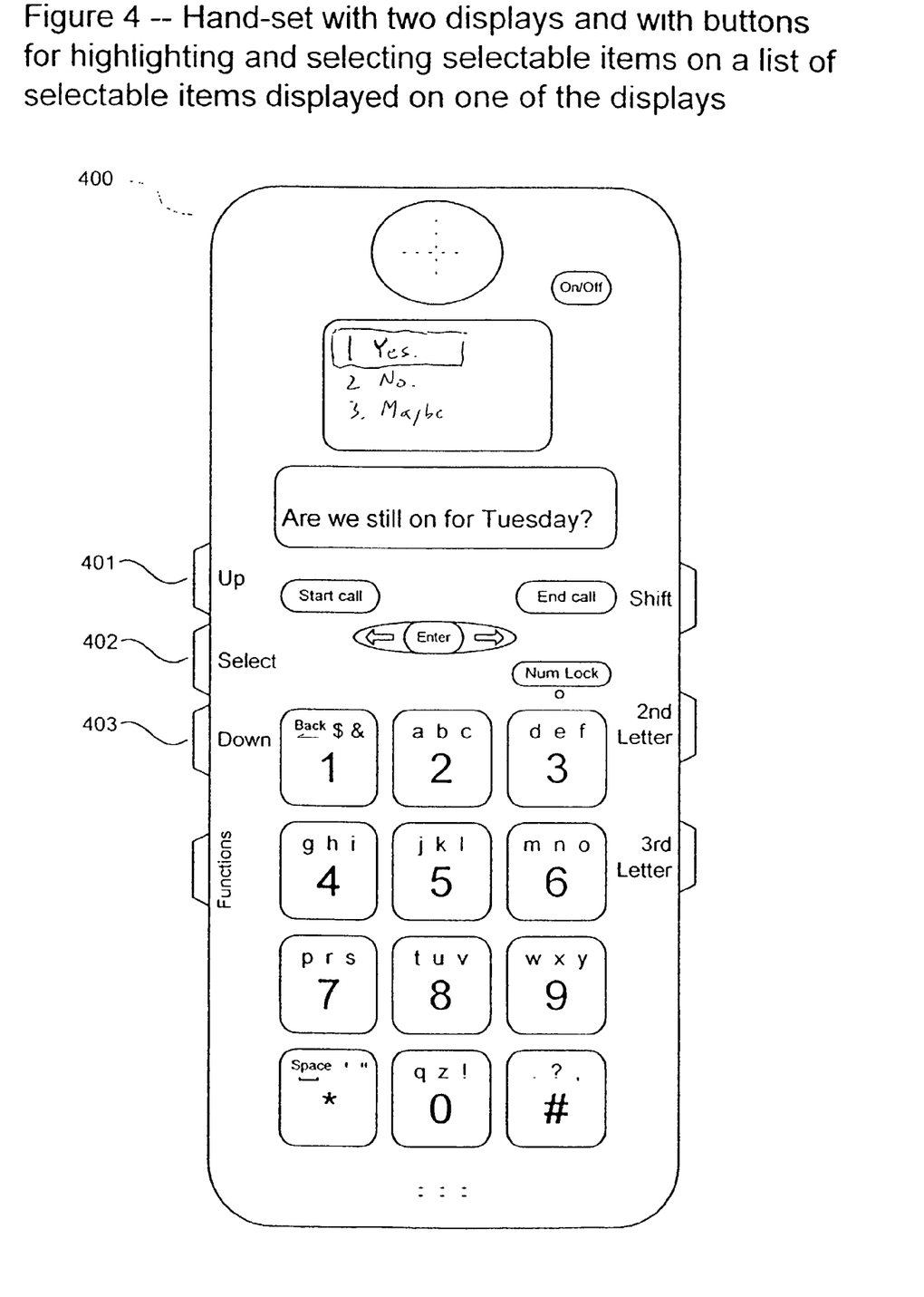
FIG. 4 is an illustration of a handset with two displays and with buttons for highlighting and selecting selectable items on a list of selectable items displayed on one of the displays.
Figure 5:
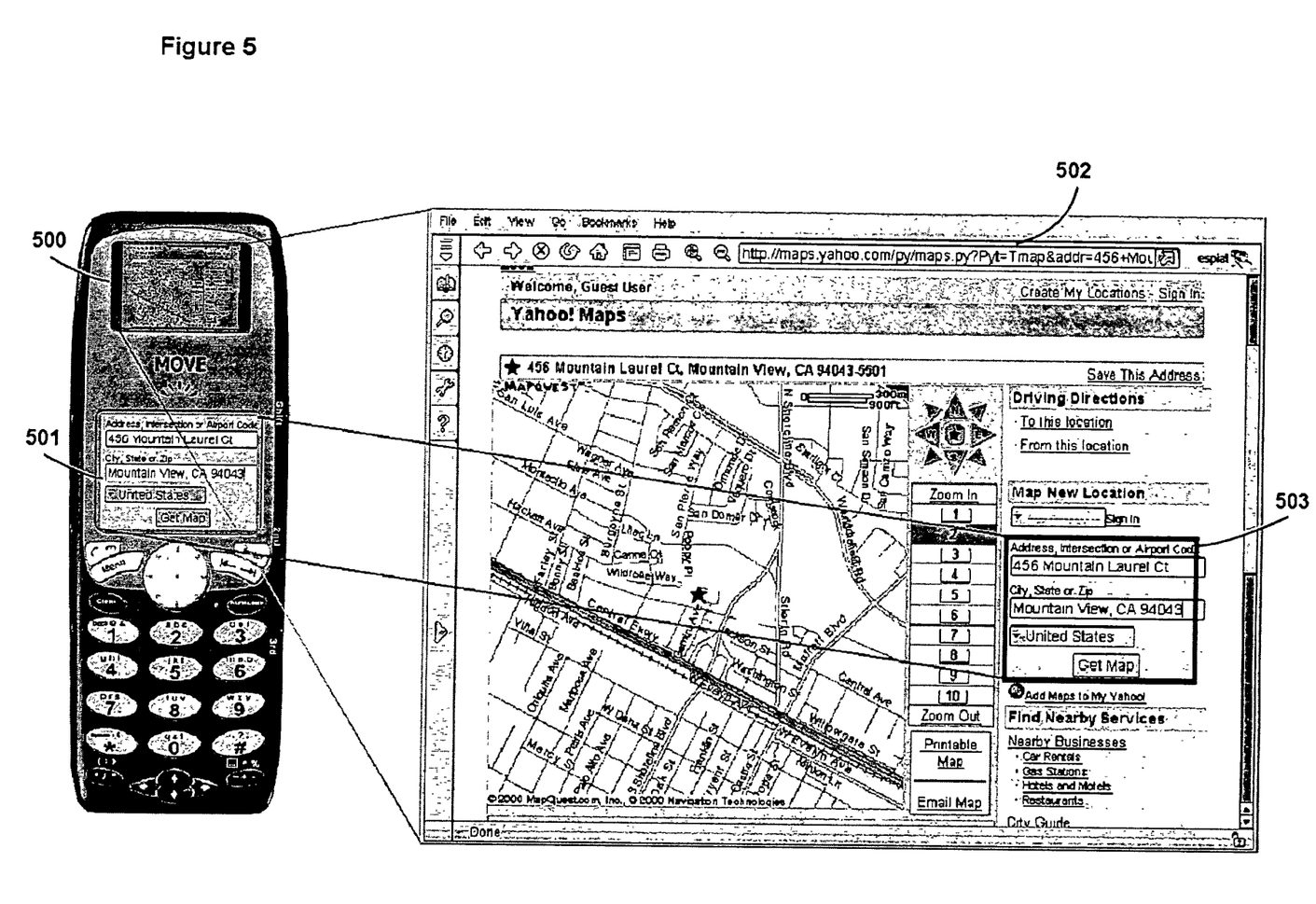
FIG. 5 is an illustration of a handset according to my invention, showing the coordination of images on the direct-view display and on the microdisplay.

As seen in FIG. 4, the device includes a button 401 that, when pressed briefly, changes the highlighting in a displayed list of selectable items from one selectable item to the previous one. This patent also refers to the highlighted selectable item as the "in-focus" item, the "item in focus", or the "focus" item. The device can also include a button 403 that, when pressed briefly, changes the highlighted item in a displayed list of selectable items from one selectable item to the next one. The device can also include a button 402 that, when pressed, selects the highlighted item in the displayed list of items. These buttons do not have to be configured as buttons 401, 402, and 403 appearing in FIG. 4: They could be configured as arrow keys and other buttons elsewhere on the device—such as the arrows and enter buttons 113 on FIG. 1B. Each of these buttons can be multiple-speed (which this patent will also refer to as "multi-speed")—for example, moving the in-focus item quickly from the currently highlighted selectable item to the next or previous one when pressed hard, but moving the highlighting slowly when pressed lightly. These buttons can go by many names—such as Tab-forward and Tab-back, up and down, and so on. This patent will refer to them generically as up and down or up/down. If they are multiple-speed, this patent will refer to them as multi-speed up/down controls. The buttons can be placed under a shared length of plastic to form a toggle switch, with one button under one side of the toggle and the other button under the other side of the toggle, as shown in FIG. 5.

As additional examples of operation of the above buttons, when the button 401 (or 403) of FIG. 4 is pressed and held for more than a defined period of time (for example, more than 0.5 second), then instead of the highlighting moving from one selectable item to the previous (or next) item just once, the highlighting moves to the previous (or next) selectable item, stays briefly (e. g. 0.25 sec), moves to the previous-to- the-previous (or next-to-the-next) selectable item, stays briefly, and continues moving back (or forward) through the list of selectable items for as long as the user continues holding the corresponding button 401 (or 403). This is simply an alternative to continuously rolling the roller control outlined above to quickly move the highlighting back and forth through the list of selectable items.

The device can also be designed such that the longer the button 401 or 403 is held, the faster the highlighting moves through the list of selectable items, up to some maximum speed (and with the speed accelerating in well defined increments from relatively slow to relatively fast).

I turn now to a description of my invention embodied in a handset of the type described above. My invention can be embodied in a handset or other hand-held device with two or more displays, one of which can show content (such as an image, document, Web page, text, or other content) that includes one or more references to other content, such as referring to an image, document, Web page, text or other content. When a user indicates the desire to view referred-to content, for example, by using a button or control to interact with the first display, such as the direct-view display, and to click on, select, or open the referred-to content, then that referred-to content is displayed on one of the other displays, such as the microdisplay, for high resolution PC display-like viewing. So a user can use the direct-view display of the device to read an email or instant message that has an attached photo or a reference to a Web page URL and when the user clicks on or selects that attachment or Web page URL, the handset displays the attachment or Web page URL in the microdisplay. In addition, the device could show a full Web page (or a large portion of a Web page) in a microdisplay, and then show a subset of that Web page in a direct-view display. When the microdisplay is displaying a document or image (such as a Web page or application form) with items that can be selected or typed in, then at any given time, zero or one of those items is "in focus" and that item is visually highlighted in some way, for example, by outlining that item in light gray. "In focus" means that if the user were to use a "select" control, by whatever name, on the handset or were to begin typing, then that "in focus" item would be the item selected, or, if it were a text entry box, it would be the item into which the characters would be typed. This is similar to the way items can be in "focus" in Web browsers or other applications on a desktop Windows PC. The item in "focus" is usually highlighted graphically in a desktop application, for example with a light gray outline. So if the microdisplay is displaying a document or image (such as a Web page or application form) and if one of the items on the document or image is "in focus," then a subset of the document or image surrounding the "in focus" item can be displayed on the direct-view display. This can provide a close-up view of the item that would be typed in or selected if the user were to type or use the handset's selection control.

The user could see this area while holding the device a foot or two away, since it is displayed in the direct-view display. And this in turn would allow the user to see the buttons and controls on the device more easily as compared to holding the handset near-to-eye. This would allow the user to more easily type or use the controls on the phone while viewing that subset of the overall web-page in the direct-view display. This is best seen in FIG. 5. In that Figure the microdisplay 500 displays the web page while the subset thereof is displayed on the direct-view display 501.

One way to implement this is to provide that the subset shown on the direct-view display would include both the "in focus" item and a text or bit-map representation of any text or graphic labels or symbols corresponding to that item on the form. For example, if the "in focus" item is a "Last name:" text-entry box on a Web-page form, then the direct-view display would show the label "Last name:" as well as the corresponding text-entry box, into which the user will type his or her last name. In practice, the item "in focus" (and hence the image subset shown on the direct-view display) can be changed by the user typing, depressing buttons, or using other controls on the device. For example, the user can use the roller control 102 in FIG. 1, or down/up buttons on FIG. 4, on the phone handset to move the focus back and forth through the list of items that can be selected or typed into the current Web page or document. As the user uses the controls to change the focus, the direct-view display should change to reflect the new focus, by showing the "region of interest" subset of the Web page or document surrounding that new in-focus item (or surrounding as much of the focus fits in the region of interest). This makes it easy for the user to always see the item that would be selected or typed-in, at any given moment, if the user were to select an item or type. FIG. 5 illustrates this concept. FIG. 5 is explained below. Additionally, the item in focus (and hence the image subset shown on the direct-view display) can be changed by the user speaking into the device, with the device itself, or a service accessed by the device over a network, using speech recognition software to interpret the user's spoken commands. Further still, the item in focus (and hence the image subset shown on the direct-view display) can be changed by software running on the computer processor within the device. This could be used to generate animations by having a large image made up of many smaller frames, and rapidly changing which subset of the larger image is displayed in the direct-view display.

The item in focus can also be changed by the user typing, pressing buttons, speaking, or using other controls on the device and, as the focus changes, the image shown in the microdisplay auto-scrolls to keep the in-focus item in view. This is similar to what happens if a user views a large Web-page form on a computer monitor and the form extends past the bottom of the window in which the form is being displayed. That is, if the user uses the Tab button repeatedly to move the focus toward the end of the form, then when the focus goes past the bottom of the window to an item that can be typed-in or selected that appears on the part of the form below the window, the Web browser will typically auto-scroll the form upward within the window so that the new in-focus item will be visible within the window. In my invention, when a user types into a text-entry field shown on one display, and that text-entry field is also shown on another display (sometimes called "echoing"), then new text that appears in the first display will also appear in the other display reflecting the fact that both displays are showing the same text-entry field. For example, if the user is wearing a wearable display attached to a hand-held device with a direct-view display, then if the user types text into a field that is being shown in both the direct-view display and in the wearable display, the new text typed will appear on both displays—so the user won't be confused as they shift their eyes back and forth between the direct-view display and the wearable display's microdisplays.

For example, if a user changes the state of a check-box, radio-button, or other "state" control that appears in more than one display, then all displays showing that same state control should show the state control in its current state. If a user types into a text-entry field shown on one or more displays, or uses arrow keys 113 of FIG. 1 or other controls to change the text-entry point or selection area, then if the text-entry point (or the end of the selection area) moves out of the subset of the document image visible in any given display, that display will automatically scroll the image so that the text-entry point (or the end of the selection area) will reappear in that display. This is similar to how documents automatically scroll in windows on desktop displays, except since this device may display different subsets of the same document in different displays, it must auto-scroll the image in different displays at different times. For example, if a relatively low-resolution direct-view display shows a small subset of a document shown in the much higher-resolution microdisplay, then the direct-view display may have to auto-scroll several times as the user types a long message into that document, while the microdisplay could auto-scroll much less often.

In contexts where the microdisplay is displaying a relatively high-resolution large apparent image (i.e. a virtual image, as discussed earlier), if the device uses a relatively low-resolution bit-map direct-view display, then at any given time the direct-view display can show a subset of the larger, higher-resolution apparent image shown in the microdisplay. That is, the direct-view display acts as a window into the larger image, showing a "region of interest" from the larger apparent image.

Further, controls on the hand-held device, such as arrow buttons or a thumb roller control or similar controls, can move the region of interest window (i. e. the borders of the subset of the Web Page, application document, or other image shown in the direct-view display) down/up right/left or in other directions across the larger image. For example, at startup, the direct-view display might show an upper-left corner subset of the image seen in the microdisplay, which itself might be a subset of a larger scrollable document or Web page. Then the user can use the controls to have the direct-view show a different subset of the image seen in the microdisplay.

Further, as the user types into a document or Web Page visible in the microdisplay, the subset of the document or Web Page that includes the text-entry point can automatically be scrolled into view in both the direct-view display and the microdisplay. That is, the "region of interest" can be automatically moved to surround the text-entry point. Usually, the region of interest shown in the direct-view display is an area of bits around the current "focus" shown in the larger image displayed on the microdisplay. For example, a Web page has a set of selectable items such as links, buttons, editable text fields, and the like. As seen on desktop PCs, at any given time, one of the selectable items can be in "focus", and users can move the focus back and forth through the set of selectable items using the Tab Backward and Tab Forward key. (On desktop PC keyboards these are usually the same key: Tab-Backward=shift Tab Forward). Users can select that selectable item that is currently in focus by depressing a button (usually the space bar).

"As discussed in published Application No. 20020158812, filed Apr. 1, 2002," a manufacturer can design a cell phone handset or other hand-held device on which a user could use a thumb-roller or other control to move the focus back and forth through the list of selectable items on the Web page or screen. As the user does this, if the Web Page or application document being viewed is larger than the image area visible in the microdisplay, then the image of the Web page or application document shown in the microdisplay should auto-scroll to always keep the focus in view in the microdisplay, just as occurs on desktop PCs when user tabs through selectable items (using the Tab key) on a large Web page displayed in a smaller Web browser window. Similarly, as the focus is moved, if the Web Page or application document being viewed is larger than the image area visible in the direct-view display, then the image of the Web page or application document shown in the direct-view display should auto-scroll to always keep the focus in view in the direct-view display. In a preferred embodiment, in accordance with the present invention, each display (when viewed) would show both the focus item (i. e. the selectable item that would get selected if the user hits the select key) and the area immediately surrounding the focus item (which will often include text or image labels corresponding to the selectable item in focus, such as "Last Name:" labels). Each display thus acts as a window onto the Web Page or Document being viewed, with the direct-view display being a smaller window than the microdisplay.

In contexts where the microdisplay is displaying a relatively high-resolution large apparent image of a Web Page, if the device uses a text-only (i. e., non-bit-map) direct-view display, then at any given time the direct-view display can show text corresponding to the item in focus on the Web Page. For example, if the item in focus is a text-entry field in a form on a Web page in which a user is supposed to type their last name, then the direct-view display can show any text immediately to the left (and/or right) of that text entry field (e. g. "Last Name:____"). This text can often be extracted from the HTML that defines the Web Page (by interpreting the HTML to determine what text lies to the left of the selectable item in focus). But often it will not be possible to extract appropriate text corresponding to the Focus item (e. g. because no text corresponding to the focus item exists). For this reason, a preferred embodiment of this device would use a bit-map direct-view display, as discussed above, instead of a text-only direct-view display.

As noted earlier, an important way this invention allows users to comfortably interact with full-size Web pages and other high-resolution or large content on pocket-size devices is by intelligently coordinating the content of direct-view displays with the content of microdisplays. Here are descriptions of a couple important embodiments of this invention.

Referring to FIG. 5, when a user is viewing a Web page 502 on a device's microdisplay 500 held near-to-eye, the device should allow the user to position a cursor (such as the arrow cursor commonly seen when moving the mouse on a desktop computer) or a rectangular outline 503 or both (or some other indication of a "region of interest") over any chosen part of the Web page 502. Then when the user moves the device out to arms'-length the user should be able to view that "region of interest" on a direct-view display 501 on the device—i.e. viewing a subset of the larger image that appeared on the microdisplay.

In FIG. 5, the lines extending from the left corners of the Web page window 502 to the phone handset's embedded microdisplay 500 are meant to show that, when the microdisplay is held near the user's eye, the user could see a relatively large, high-resolution image like the Web page window 502. And the longer narrower lines extending from the "region of interest" rectangle 503 to the handset's direct-view display 501 are meant to show that a small portion of the Web page could be made visible on the direct-view display. In this example, the current region of interest is a small form on the Web page where the user could enter an address to look up a map.

When the direct-view display 501 displays this region of interest (the area within the rectangle 503), the direct-view display acts as a window onto the larger image that would be seen on the microdisplay if the microdisplay were held near-to-eye. While viewing the direct-view display 501 at arms'-length (that is, at a normal reading distance), a user should be able to read text or interact with content in that region of interest, or use controls on the device to scroll the region of interest left, right, up, down, or other directions, to see different parts of the image other than the subset of the image currently shown in the direct-view display. If the user moves the region of interest while viewing the image in the direct-view display, then when the user returns to viewing the image in the microdisplay, the device can graphically indicate where the region of interest has moved—for example, by overlaying a rectangle 503 in the shape and size of the region of interest on top of the image seen in the microdisplay. The shape and size of the region of interest should generally be the same as, or close to, the pixel width and height of the direct-view display 501.

As illustrated in FIG. 5, the direct-view display 501 will typically have substantially fewer pixels than the microdisplay. For example, today's smartphones typically have displays that are less than 200 pixels wide and less than 250 pixels tall, and today's PDAs typically have displays that are less than 300 pixels wide and less than 400 pixels tall. By contrast, Inviso Inc.'s current microdisplays are capable of displaying 800×600 pixel areas. The size and shape of the direct-view display can be used to define the size and shape of the region of interest. As the user uses controls on the device (or speech recognition, or other means) to move the region of interest around while viewing content on the microdisplay, the device can show the location of the region of interest by displaying a rectangle 503 of that size on the image being viewed in the microdisplay 500. As the user moves the region of interest, the rectangle moves around the image. If the user then views the region of interest in the direct-view display 501 at arms'-length, and then uses controls on the device (or other means) to scroll the region of interest to other parts of the content being viewed (as described earlier), then when the user brings the device near-to-eye to view the content in the microdisplay, the rectangle showing the region of interest should be shown on the microdisplay in its new location on the image being viewed.

Note that using a rectangle to show the region of interest is just one option. The device could use a range of techniques to indicate the region of interest on the microdisplay. Or device makers can choose not to explicitly mark the region of interest on the microdisplay image—choosing instead just to treat the area surrounding the cursor or surrounding highlighted "in focus" areas (discussed elsewhere in this patent) as the region of interest. Alternatively, if the region of interest is marked on the microdisplay (with a rectangle, for example), then device makers can give users the option of hiding that mark or showing that mark.

Figure 6:
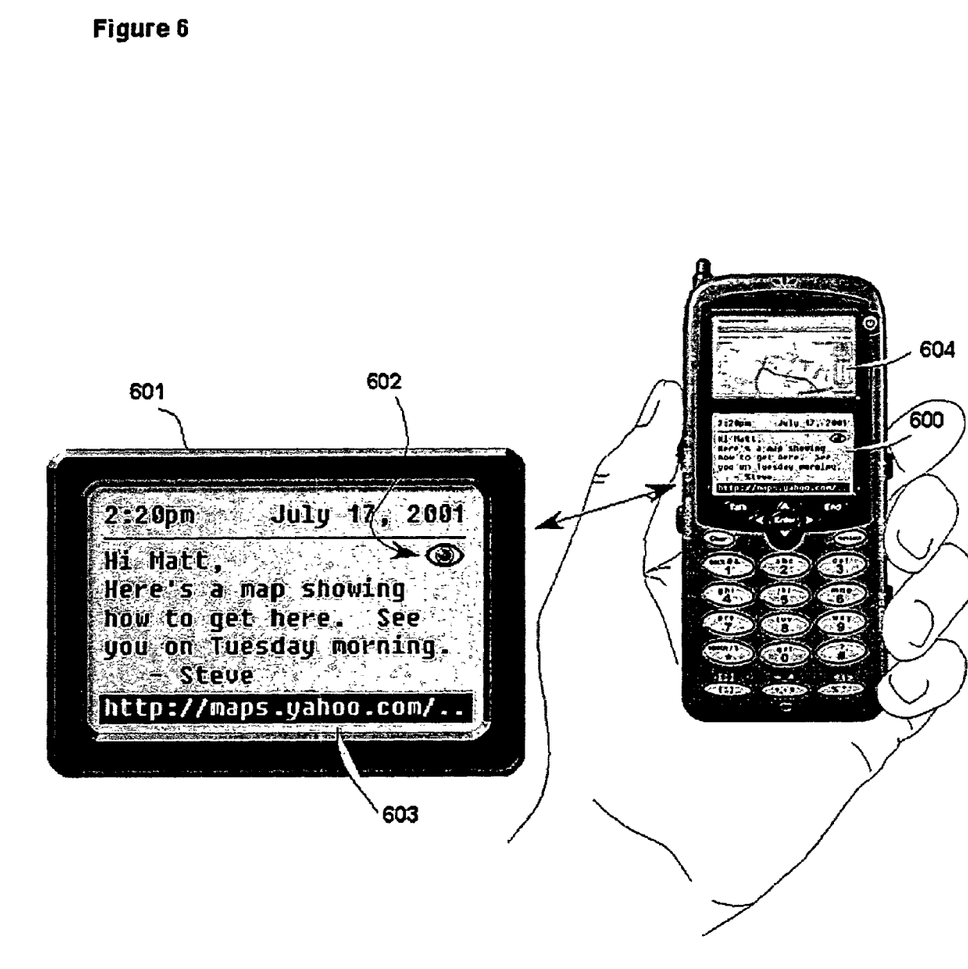
FIG. 6 is an illustration of a handset according to my invention, showing an indication on the direct-view display (shown in close up on the left of FIG. 6) that there is new content ready for viewing on the handset's microdisplay.

As discussed above, it is sometimes useful to display an icon or other visual cue on a direct-view display when there is new content for the user to look at in the microdisplay, and vice-versa, since it can be hard to see content on the microdisplay when looking at the direct-view display, and vice-versa. FIG. 6 illustrates a preferred embodiment for providing this visual cue. The sample phone on the right side of FIG. 6 has a microdisplay 604 near the top and a direct-view display 600 below the microdisplay. The direct-view display 601 is shown in close-up on the left side of FIG. 6. In this example, the user (Matt) has received an instant message. The user would typically read instant messages at arms'-length (i.e. normal reading distance) on a direct-view display 600 (shown in close up on the left 601). The instant message in this example includes a URL 603 referring to a Web page with a map (similar to the Web page shown in FIG. 5.) In this preferred embodiment, when the user operates controls on the phone to open the Web page associated with the URL, the device will display a flashing eye icon 602 on the direct-view display while the device is downloading and preparing that Web page for display. And when the Web page is ready for viewing on the microdisplay 604, the device would display a steady (i.e. non-flashing) eye icon 602. The form of the indication is not important—it could be a different icon, or text, or some other visual cue, and it could flash or not-flash. The important point is that, when a user is holding a device at arms'-length, there are times when it is difficult for them to know when there have been significant changes to the content available for viewing on the near-to-eye microdisplay (since it can be difficult to see content on a microdisplay at arms'-length), so at those times, it is useful to provide visual cues on the direct-view display. Similarly, if the user is viewing content on the microdisplay, in some cases it could be useful to provide visual cues on the microdisplay when there is significant new content available for viewing on the direct-view display, since the user may not think to look at the direct-view display while looking at the microdisplay (even if the microdisplay is on a head-mounted wearable display rather than embedded in the hand-held device with the direct-view display).

In the foregoing discussion, we have used Web pages as our primary example of content that can be accessed more easily by intelligently coordinating the images displayed on a device's direct-view display and microdisplay. But it will be appreciated by those skilled in the art that the same techniques can be applied to a wide range of content, including computer applications, documents (including spreadsheets, presentations, and word-processor documents, among others), photos, video, and more.

The present invention can be used when designing devices with a wide range of form-factors and configurations. For example, a device with a direct-view display on its face and a microdisplay embedded near the top of the device works well. But device makers could choose to embed or attach one or more microdisplays to any part of the device (e.g. on a hinge on the bottom of the phone or on the side) and still use this invention to intelligently coordinate content on the device's multiple displays and thereby improve the ergonomics of the device.

While the foregoing has been with reference to particular embodiments of the invention, it will be appreciated by those skilled in the art that changes in these embodiments may be made without departing from the principles and spirit of the invention, the scope of which is defined by the appended claims.

I claim:

1. A phone handset or other hand-held device which displays images and operates on functions transmitted remotely from said device, said device comprising a face, said face having two or more displays for displaying said images and control elements for controlling said displays, wherein at least one display is a direct-view display or a microdisplay, and such at least one of said functions is displayed in the direct-view display and a user can operate said control elements to affect visual changes on one or more of the displays, the displayed function including an attachment that can be displayed in the microdisplay and (1) the displayed function is taken from the group of functions consisting of instant messaging, email, contact management, schedule maintenance, calculation functions and placing telephone calls, viewing Internet content, and viewing other types of documents and (2) the attachment is an attachment taken from the group of attachments consisting of a Web page URL, a photo image, a spreadsheet, a presentation, an Adobe Acrobat file, a Word Processor document, and other types of content, and (3) the controls are capable of operation by a user to display that attachment in the microdisplay.

2. The device of claim 1 in which the device has exactly two displays.

3. The device of claim 1 in which the device includes one direct-view display and one microdisplay.

4. The device of claim 1 further including a distance sensor wherein the user affects displaying said attachment in the microdisplay by bringing the microdisplay to the user's eye.

5. The device of claim 1 further including control elements which, when activated, cause the device to display an indication in the direct-view display that indicates to the user when all or part of said attachment is being downloaded or prepared for display on the microdisplay, or cause the device to display an indication in the direct-view display that indicates when the attachment is ready for viewing on the microdisplay.

6. A phone handset or other hand-held device with two or more displays, said device comprising:
   one direct-view display and one microdisplay, in which device when a first display is displaying first content having items that can be selected or typed in, one of such items is in-focus;
   controls operable by a user to (1) cause one of the displays to display first content that includes one or more references to other content, and (2) cause that referred-to content to be displayed in one of the other displays, wherein the item in-focus can be changed by the user typing, depressing buttons, speaking, or using other controls on the device, and in which, as the focus changes, if the microdisplay is displaying an image, the image shown in the microdisplay auto-scrolls to keep the in-focus item in view, and, if the direct-view display is displaying an image, the image shown in the direct-view display auto-scrolls to keep the in-focus item in view;

controls operable by a user that cause, if the device has prepared an image having one item in-focus for display in the microdisplay, a subset of said image surrounding the in-focus item to be displayed in the direct-view display; and a computer processor in which both said item in-focus in said microdisplay and said image subset displayed in the direct-view display can be changed by software running on said computer processor within the device.

7. The device of claim 6 in which the device has exactly two displays.

8. The device of claim 6 including a microphone and voice recognition software that can allow a user to cause the in-focus item to change from one selectable item to another one by the user speaking into the device.

9. A phone handset or other hand-held device which displays images, said device comprising:

two or more displays for displaying said images and control elements for controlling said displays, wherein a user can operate said control elements to cause a microdisplay to display an image and cause a direct-view display to display a region of interest subset of said image, the microdisplay displaying a relatively high-resolution large apparent image and the direct-view display being a low-resolution bit-map direct-view display, said direct view display acting as a window into said larger apparent image, said device being capable of displaying a subset of said image in at least one of said displays and further having at least one of the group consisting of (1) a plurality of face-keys capable of being depressed by a user to generate text typed into a text-entry field shown on said one or more displays, and (2) arrow keys or other controls which, when actuated by a user, change said text-entry point, wherein if the text-entry point moves out of the subset of said image visible in any given display, then that display will automatically scroll the image so that the text-entry entry point will reappear in that display;

controls operable by a user to move the borders of said region of interest subset displayed in the direct-view display down or up or right or left or other directions across the image displayed in the microdisplay; and face-keys for entering text, the image is a document or Web Page and, as the user operates said face-keys to enter text into said document or Web page, the subset of the document or Web Page that includes the text-entry point is automatically scrolled into view in both the direct view display and the microdisplay, wherein the subset displayed in the direct-view display is an area of bits containing all or part of the current in-focus area of the image displayed in the microdisplay.

10. The device of claim 9 having a plurality of face-keys capable of being depressed by a user to generate new text into a text-entry field displayed in a first display, which text-entry field is also shown on a second display such that the new text that appears in said first display will also appear in said second display.

11. The device of claim 9 including at least one control button capable of being depressed by a user to generate a changed state of a check box, radio-button, or other state control that appears in more than one display, and concurrently changing to said changed state all displays showing that same check box, radio-button or other state control.

12. A computer implemented process generating codes for interpreting the operation of control elements on a phone handset or other hand-held device which displays images, the control elements including first controls capable of operation by a user to display that attachment in the microdisplay, the control elements further including second control elements which, when activated by the user, display an indication in the direct-view display that indicates to the user that the attachment has been opened and is being displayed in the microdisplay and said codes effecting such display of such indication in response to said activation, said codes effecting such display of such attachment in response to operation of said second controls, said process operating on functions transmitted remotely from said device, wherein such functions are selected from the group consisting of the function is taken from the group of functions consisting of instant messaging, email, contact management, schedule maintenance, calculation functions, placing telephone calls, viewing Internet content, and viewing other types of documents, at least one of said functions being displayed in the direct-view display, wherein the displayed function includes an attachment that can be displayed in the microdisplay, said phone handset or other device having (1) a face, said face having two or more displays for displaying said images, wherein at least one display is a direct-view display or a microdisplay, and (2) control elements operable by the user for controlling said displays, said codes effecting visual changes on one or more of the displays in response to such operation, wherein said control elements include a distance sensor, said codes effecting displaying said attachment in the microdisplay in response to the user bringing said distance sensor to the user's eye, the attachment being an attachment taken from the group of attachments consisting of a Web page URL or a photo image, a spreadsheet, a presentation, an Adobe Acrobat file, a Word Processor document, and other types of content; said phone handset or other hand-held device further including a menu button and, if a user depresses said menu button while said distance sensor senses that the microdisplay on said device is close to an object, then the device will display a menu on the microdisplay, and otherwise the device will display said menu on the direct-view display.

13. A computer implemented process generating codes for interpreting the operation of control elements on a phone handset or other hand-held device which displays images, said phone handset or other device comprise:

two or more displays for displaying said images, the microdisplay displaying a relatively high-resolution large apparent image, the direct-view display is a low-resolution bit-map direct-view display, said direct-view display acting as a window into said larger apparent image;

control elements for controlling said displays, wherein a user can operate said control elements to cause a first display to display an image and cause a second display to display a region of interest subset of said image, and said codes effect displaying of said subset in response to the operation of said control elements, wherein said codes effecting said subset of said image are being so displayed in response to the operation of said third controls, said control elements further including third controls operable by a user to cause, if the device has prepared an image having one item in-focus for display in the microdisplay, a subset of said image surrounding the in-focus item to be displayed in the direct-view display, and the item in-focus can be changed by the user typing, depressing buttons, speaking, or using other controls on the device, and in which, as the focus changes, if the microdisplay is displaying an image, the image shown in the microdisplay auto-scrolls to keep the in-focus item in view, and, if the direct-view display is displaying an image, the image shown in the direct-view display auto-scrolls to keep the in-focus item in view, the device being capable of displaying a subset of said image in at least one of said displays and further having at least one of the group consisting of (1) a plurality of face-keys capable of being depressed by a user to generate text typed into a text-entry field shown on said one or more displays, and (2) arrow keys or other controls which, when actuated by a user, change said text-entry point, wherein if the text-entry point moves out of the subset of said image visible in any given display, then said codes effect said any given display automatically scrolling the image so that the text-entry point will reappear in said any given display;

a first display being a microdisplay and a second display being a direct-view display, and a subset of said control elements being operable by a user to move the borders of said region of interest subset displayed in the direct-view display down or up or right or left or other directions across the image displayed in the microdisplay, said codes effecting said movement of said borders in response to the operation of said subset of said control elements, and the subset displayed in the direct-view display is an area of bits containing all or part of the current in-focus area of the image displayed in the microdisplay;

a microphone and voice recognition software that allows a user to cause the in-focus item to be changed from one selectable item to another one by the user speaking into the device, said codes effecting said change in response to the user so speaking; and face-keys operable by a user to enter text, the image is a document or Web Page having a text entry point, said codes effecting the subset of the document or Web Page that includes the text-entry point being automatically scrolled into view in both the direct-view display and the microdisplay in response to the user operating said face-keys to enter text into said document or Web page.

14. A storage medium having embedded therein a computer implemented process generating codes for interpreting the operation of control elements on a phone handset or other hand-held device which displays images, wherein said control elements include a distance sensor and first controls capable of operation by a user to display that attachment in the microdisplay, said control elements further including second control elements which, when activated by the user, display an indication in the direct-view display that indicates to the user that the attachment has been opened and is being displayed in the microdisplay and said codes effecting such display of such indication in response to said activation, said codes effecting such display of such attachment in response to operation of said second controls, said codes effecting displaying said attachment in the microdisplay in response to the user bringing said distance sensor to the user's eye, the attachment being an attachment taken from the group of attachments consisting of a Web page URL or a photo image, a spreadsheet, a presentation, an Adobe Acrobat file, a Word Processor document, and other types of content, said phone handset or other device operating on functions transmitted remotely from said device, wherein such functions are selected from the group consisting of instant messaging, email, contact management, schedule maintenance, calculation functions, placing telephone calls, viewing Internet content, and viewing other types of documents, and at least one of said functions is displayed in the direct-view display, and the displayed function includes an attachment that can be displayed in the microdisplay, said device comprising:

a face, said face having two or more displays for displaying said images, wherein at least one display is a direct-view display or a microdisplay; and control elements operable by a user for controlling said displays, said code effecting visual changes on one or more of the displays in response to such operation.

15. A storage medium having embedded therein a computer implemented process generating codes for interpreting the operation of control elements on a phone handset or other hand-held device which displays images, said phone handset or other device:

two or more displays for displaying said images, the microdisplay displaying a relatively high-resolution large apparent image, the direct-view display is a low-resolution bit-map direct-view display, said direct-view display acting as a window into said larger apparent image;

control elements for controlling said displays, wherein a user can operate said control elements to cause a first display to display an image and cause a second display to display a region of interest subset of said image, and said codes effect displaying of said subset in response to the operation of said control elements, wherein said codes effecting said subset of said image are being so displayed in response to the operation of said third controls, said control elements include third controls operable by a user to cause, if the device, has prepared an image having one item in-focus for display in the microdisplay, a subset of said image surrounding the in-focus item to be displayed in the direct-view display, said codes effecting said subset of said image being so displayed in response to the operation of said third controls, and the item in-focus can be changed by the user typing, depressing buttons, speaking, or using other controls on the device, and in which, as the focus changes, if the microdisplay is displaying an image, the image shown in the microdisplay auto-scrolls to keep the in-focus item in view, and, if the direct-view display is displaying an image, the image shown in the direct-view display auto-scrolls to keep the in-focus item in view, the device being capable of displaying a subset of said image in at least one of said displays and further having at least one of the group consisting of (1) a plurality of face-keys operable by a user to enter text, the image is a document or Web Page having a text entry point, said codes effecting the subset of the document or Web Page that includes the text-entry point being automatically scrolled into view in both the direct-view display and the microdisplay in response to the user operating said face-keys to enter text into said document or Web page, and (2) arrow keys or other controls which, when actuated by a user, change said text-entry point, wherein if the text-entry point moves out of the subset of said image visible in any given display, then said codes effect said any given display automatically scrolling the image so that the text-entry point will reappear in said any given display;

a first display being a microdisplay and a second display being a direct-view display, and a subset of said control elements being operable by a user to move the borders of said region of interest subset displayed in the direct-view display down or up or right or left or other directions across the image displayed in the microdisplay, said codes effecting said movement of said borders in response to the operation of said subset of said control elements, and the subset displayed in the direct-view display is an area of bits containing all or part of the current in-focus area of the image displayed in the microdisplay;

a microphone and voice recognition software that allows a user to cause the item in-focus to be changed from one selectable item to another one by the user speaking into the device, said codes effecting said change in response to the user so speaking; and a computer processor in which both said item in-focus in said microdisplay and said image subset displayed in the direct-view display can be changed by software running on said computer processor.

16. A computer implemented process generating codes for interpreting the operation of control elements on a phone handset or other hand-held device which displays images, said phone handset or other device having (1) two or more displays for displaying said images and (2) control elements for controlling said displays, wherein a user can operate said control elements to cause a first display to display an image and cause a second display to display a region of interest subset of said image, and said codes effect displaying of said subset in response to the operation of said control elements, wherein said control elements include third controls operable by a user to cause, if the device has prepared an image having one item in-focus for display in the microdisplay, a subset of said image surrounding the in-focus item to be displayed in the direct-view display, said codes effecting said subset of said image being so displayed in response to the operation of said third controls, said device further having a microphone and voice recognition software that allows a user to cause the in-focus item to be changed from one selectable item to another one by the user speaking into the device, said codes effecting said change in response to the user so speaking.

17. The process of claim 16 wherein said control elements include first controls operable by a user to (1) display substantially a full Web page in one display and (2) display a close up view of one subset of that Web page in another of the displays, said codes effecting said displaying in said one display and said displaying in said another of the displays in response to the operation of said first controls.

18. The process of claim 16 in which the device includes one direct-view display and one microdisplay.

19. The process of claim 18 wherein the microdisplay displays a relatively high-resolution large apparent image, the direct-view display is a low-resolution bit-map direct-view display, said direct-view display acting as a window into said larger apparent image.

20. The process of claim 19 wherein the device further includes face-keys operable by a user to enter text, the image is a document or Web Page having a text entry point, said codes effecting the subset of the document or Web Page that includes the text-entry point being automatically scrolled into view in both the direct-view display and the microdisplay in response to the user operating said face-keys to enter text into said document or Web page.

21. The process of claim 19 in which the subset displayed in the direct-view display is an area of bits containing all or part of the current in-focus area of the image displayed in the microdisplay.

22. The process of claim 16 wherein said control elements include second controls operable by a user which, when a first display is displaying first content having items that can be selected or typed in, cause one of such items to be in-focus, said codes effecting said one of such items.

23. The process of claim 22 wherein, in response to the user operating said second controls, said codes effect said one in-focus item being highlighted by outlining that item in a visually recognizable shade.

24. The process of claim 23 wherein the device has a select function operable by a user to select said one in-focus item, said codes effecting selecting said one item into in response to the operation of said select function.

25. The process of claim 24 wherein the device further includes one or more face-keys-which, when depressed by a user, causes a character to be typed into said one item if said one item is an editable text field, said codes effecting said character being so typed in response to the user depressing said one or more face-keys.

26. The process of claim 16 in which the subset displayed in the direct-view display is a close up view of said one item.

27. The process of claim 16 in which the subset displayed in the direct-view display includes both the in-focus item and a text or bit-map representation of text or graphic labels or symbols corresponding to that item.

28. The process of claim 27 in which the device includes at least one control element from the group consisting of a roller control or up/down buttons or multi-speed up/down controls capable of operation by the user to cause the in-focus item to change from the current in-focus item to the previous or next item that can be selected or typed in.

29. The process of claim 28 wherein the process includes software that causes the image displayed in the direct-view display to concurrently change when the in-focus item changes from one selectable item to a new in-focus item.

30. The process of claim 29 in which said image is changed by displaying a subset of the image surrounding all or part of said new in-focus item.

31. The process of claim 16 in which the in-focus item is a "Last Name" text entry box on a Web-page form and the subset includes the label "Last Name" and the corresponding text-entry box into which the last name will be typed.

32. The process of claim 16 wherein the control elements include fourth controls operable by a user to cause the subset displayed in the direct-view display to be changed by user operation, said codes effecting said change in response to said user operation.

33. The process of claim 16 wherein the device includes a computer processor in which both said item in-focus in said microdisplay and said image subset displayed in the direct-view display can be changed by software running on said computer processor within the device.

34. The process of claim 16 wherein said change generates animations by having a large image made up of many smaller frames, and rapidly changing which subset of the larger image is displayed in the direct-view display.

35. The process of claim 16 in which the item in-focus can be changed by the user typing, depressing buttons, speaking, or using other controls on the device, and in which, as the focus changes, if the microdisplay is displaying an image, the image shown in the microdisplay auto-scrolls to keep the in-focus item in view, and, if the direct-view display is displaying an image, the image shown in the direct-view display auto-scrolls to keep the in-focus item in view.

36. The process of claim 16 wherein the device has a plurality of face-keys capable of being depressed by a user to generate new text into a text-entry field displayed in a first display, which text-entry field is also shown in a second display such that the new text that appears in said first display will also appear in said second display, said codes effecting said new text appearing in said first display an in said second display in response to the user so depressing said face keys.

37. The process of claim 16 wherein the device includes at least one control button capable of being depressed by a user to generate a changed state of a check box, radio-button, or other state control that appears in more than one display, and concurrently changing to said changed state all displays showing that same check box, radio-button or other state control.

38. The process of claim 16 in which the device is capable of displaying a subset of said image in at least one of said displays and further having at least one of the group consisting of (1) a plurality of face-keys capable of being depressed by a user to generate text typed into a text-entry field shown on said one or more displays, and (2) arrow keys or other controls which, when actuated by a user, change said text-entry point, wherein if the text-entry point moves out of the subset of said image visible in any given display, then said codes effect said any given display automatically scrolling the image so that the text-entry point will reappear in said any given display.

39. The process of claim 16 wherein a first display is a microdisplay and a second display is a direct-view display, and a subset of said control elements are operable by a user to move the borders of said region of interest subset displayed in the direct-view display down or up or right or left or other directions across the image displayed in the microdisplay, said codes effecting said movement of said borders in response to the operation of said subset of said control elements.

40. A computer implemented process generating codes for interpreting the operation of control elements on a phone handset or other hand-held device which displays images, said phone handset or other device having (1) one direct-view display and one microdisplay for displaying said images and (2) control elements for controlling said displays, wherein a user can operate said control elements to cause the microdisplay to display an image and cause the direct-view display to display a region of interest subset of said image, and said codes effect displaying of said subset in response to the operation of said control elements; wherein the microdisplay displays a relatively high-resolution large apparent image, the direct-view display is a low-resolution bit-map direct-view display, said direct-view display acting as a window into said larger apparent image.

41. A computer implemented process generating codes for interpreting the operation of control elements on a phone handset or other hand-held device which displays images, said phone handset or other device having (1) one direct-view display and one microdisplay for displaying said images and (2) control elements for controlling said displays, wherein a user can operate said control elements to cause the microdisplay to display an image and cause the direct-view display to display a region of interest subset of said image, and said codes effect displaying of said subset in response to the operation of said control elements; wherein a subset of said control elements are operable by a user to move the borders of said region of interest subset displayed in the direct-view display down or up or right or left or other directions across the image displayed in the microdisplay, said codes effecting said movement of said borders in response to the operation of said subset of said control elements.

* * * * *